United States Patent [19]

Clark

[11] Patent Number: 5,216,658
[45] Date of Patent: Jun. 1, 1993

[54] ENLARGED-SPOT ERASURE OF OPTICAL MEDIA IN DUAL-BEAM SYSTEMS

[75] Inventor: Bryan Clark, Sunnyvale, Calif.

[73] Assignee: Tandy Corporation, Ft. Worth, Tex.

[21] Appl. No.: 558,717

[22] Filed: Jul. 26, 1990

[51] Int. Cl.$^5$ .................................................. G11B 7/00
[52] U.S. Cl. ..................................... 369/100; 369/111
[58] Field of Search .............. 369/100, 109, 110, 112, 369/116, 121, 122, 13, 44.37, 44.38, 44.39, 44.41, 44.26, 111; 360/114, 59

[56] References Cited

U.S. PATENT DOCUMENTS

| | | | |
|---|---|---|---|
| 4,398,203 | 8/1983 | Cornet | 346/135.1 |
| 4,651,172 | 3/1987 | Watanabe et al. | 346/135.1 |
| 4,710,911 | 12/1987 | Yamada et al. | 369/100 |
| 4,719,615 | 1/1988 | Feyrer et al. | 369/284 |
| 4,841,514 | 6/1989 | Tsuboi et al. | 369/44.11 |
| 4,879,709 | 11/1989 | Clark | 369/284 |
| 4,896,314 | 1/1990 | Skiens et al. | 369/284 |
| 4,939,717 | 7/1990 | Ohno et al. | 369/116 |

FOREIGN PATENT DOCUMENTS

61-214228  9/1986  Japan .................................. 369/100

OTHER PUBLICATIONS

Michael B. Martin et al., USSN 152, 696, filed Feb. 5, 1988, entitled "Bulk Eraser for Optical Memory Media".

Der-Chang Hsieh, USSN 459,923, filed Jan. 2, 1990, entitled "System and Method for Erasing Light-Responsive Optical Disks".

*Primary Examiner*—Tommy P. Chin
*Assistant Examiner*—Thai Tran
*Attorney, Agent, or Firm*—Townsend and Townsend Khourie and Crew

[57] ABSTRACT

An apparatus and method for erasing data from optical media in dual beam systems. The erase spot is focused to have a diameter equal to three times the track pitch of the medium. The larger erase spot eases spot alignment requirements since even beam misalignments of half a track width still supply enough energy to the medium to erase the data bump. The larger erase spot heats a larger area more gradually than a single track width erase beam and thereby also enables a more complete erasure of the medium.

8 Claims, 7 Drawing Sheets

ENLARGED-SPOT ERASURE OF OPTICAL MEDIA IN DUAL-BEAM SYSTEMS

BACKGROUND OF THE INVENTION

This invention relates to erasable optical media and in particular to erase techniques for erasable optical media. Optical media store information; computer data or audio/video information for example, in digital form. The most common optical media formats include computer hard disc peripheral memory, video laser disc, compact disc and digital tape.

The information stored on an optical medium is represented in binary form by physically creating a pattern of bumps in the medium. The bump pattern can be read by focusing a laser beam on the medium and reading the reflection. The bumps, or pits, contained in the medium increase the optical path of the beam, creating an interference pattern that decreases the intensity of light reflected from the area containing the bump. The read device detects these variations in light intensity and converts this data to an electrical signal which is then processed into the desired output.

To create the bump pattern on the medium, a write beam is passed over the medium and turned on at those locations where a bump is desired. Several different erasable optical media structures exist, and the formation of the bump by the write beam differs slightly in each of the specific structures. One example of a dye polymer erasable optical disc medium is that described in U.S. Pat. No. 4,874,709 to Clark et al. which is incorporated herein by reference for all purposes. The medium described in Clark contains both an expansion layer and a retention layer. The expansion layer absorbs energy emitted by the write beam causing it to heat up and expand into the retention layer which has also been softened by the energy of the write beam. Once the write beam passes over, the media starts to cool. The retention layer, however, returns to its original hardened state much faster than the expansion layer can contract. The region of the expansion layer which expanded into the retention layer continues to cool but is now held in tension by the hardened retention layer and a bump is formed.

To erase the bump, an erase beam, usually having a different wavelength from the write beam, is passed over the bump location. The erase beam is focused on the plane of the retention layer and causes the retention layer to become soft. The erase beam does not, however, cause the expansion layer to expand. When the retention layer becomes soft, the cooled expansion layer is no longer held in tension by the retention layer and snaps back to its original position, thereby eliminating the bump.

Typical erasable systems are dual beam systems in which the erase beam passes over the medium in advance of the write beam and performs a bit by bit, or bump by bump, erasure of the data stored on the disc, returning the media to its virgin state. The write beam then imprints a new pattern of bumps on the medium to represent the new data. A distance of three to four tracks separates the center of the erase beam from the center of the write beam to prevent newly written data from being inadvertently erased. The read beam passes over the medium at a later time to retrieve the data currently stored on the medium.

The bit by bit erasure system imposes severe requirements on the erase beam. In particular, the narrow focus erase beam of the typical system must remain in close alignment with the bump to be erased to ensure complete erasure. This requirement leaves the erase system susceptible to alignment, mechanical vibration and media warpage problems.

The narrow focus erase beam also means that the optical medium must receive a short concentrated dose of energy to produce the desired thermal change in the medium. When the erase beam is turned off, the retention layer is quenched by the relatively cool surrounding material. The quenching process happens so rapidly that the retention layer cannot respond fast enough to the cooling process and occasionally a small mark is locked into the media. This mark constitutes an incomplete erasure which can be read by the playback system as a data bump. This particular problem becomes even more acute in optical media which use a single layer to store data instead of the multilayer system of Clark.

SUMMARY OF THE INVENTION

In some optical storage applications such as random access computer memory, bit by bit access and erasure is desireable. However, not every type of data stored on an optical medium requires the erase system to randomly access and erase individual bits of data stored thereon. For example, the information on a compact disc or laser disc consists of programs containing large blocks of sequential data arranged in tracks.

The present invention provides an erase system for those applications not requiring bit by bit erasure and reduces system cost by alleviating erase beam design and performance requirements. According to one embodiment of the invention, the erase beam diameter is three times the track pitch. The erase beam can thus be misaligned over the bump by a given amount and still provide enough energy to remove the bump from the medium.

The erase system of the present invention also ensures a more complete erasure of the medium. Since the erase spot is approximately three times larger than the record spot, the erase spot spends three times longer on a given area of the media. This system permits a gentle heating and lower peak temperature for bump erasure. Second, the erase beam of the present invention heats a larger area and via conduction an even greater area than the spot erase beam. The area containing the removed bump is not, therefore, immediately quenched by the cool surrounding material. These two facts help ensure even and gentle heating and cooling cycle for the medium which permits the medium to return more closely to its virgin state and results in a more complete erasure than that provided by narrow erase beams.

DESCRIPTION OF SPECIFIC EMBODIMENTS

Erasable Optical Disc Overview

Figure 1:
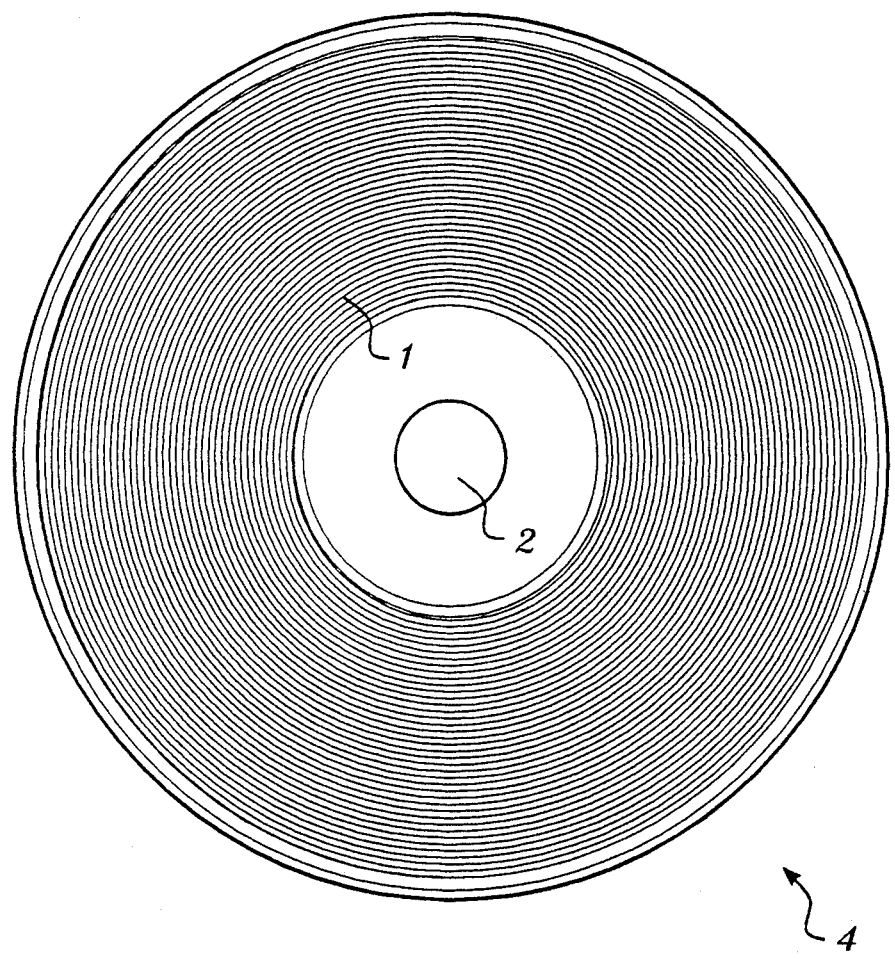
FIG. 1 shows a plan view of an erasable optical disc.
Figure 2:
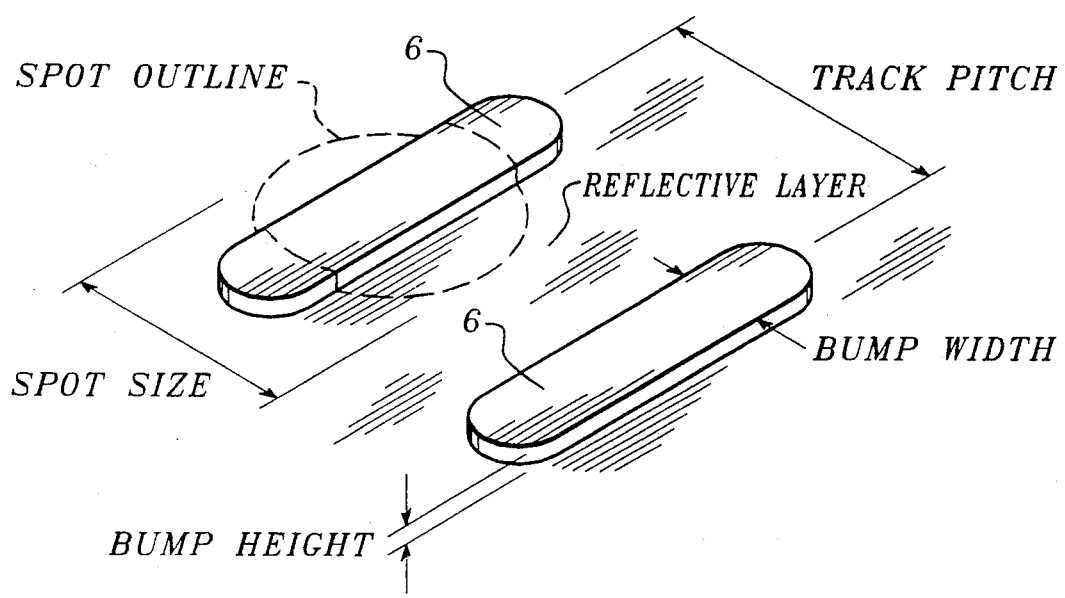
FIG. 2 is a magnified view of data bumps on the surface of an erasable optical disc.

Optical media contain digital information arranged in tracks on a disc. FIG. 1 shows a plan view of an optical data disc in which the tracks 1 are arranged in a spiral starting at the center 2 of the disc 4. Digital information contained on tracks 1 is represented by patterns of bumps 6 in the disc medium. FIG. 2 illustrates how bumps 6 appear on the surface of the medium. The track pitch provides a measure of the distance between adjacent data bumps on tracks. In FIG. 2 the track pitch is shown as the centerline distance between the bumps. Alternately, the track pitch can be measured as the edge-to-edge distance.

Figure 3A:
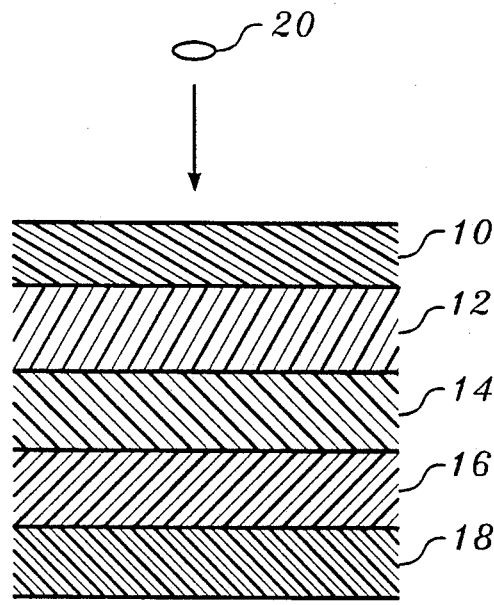
FIG. 3A to FIG. 3D are cross-section views of an erasable optical media.
Figure 3B:
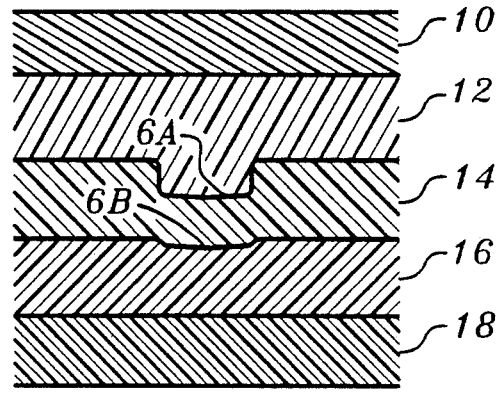

FIG. 3B shows cross sections of an erasable optical media containing a previously recorded data bump 6 which must now be erased. The cross section shown is of a dye polymer erasable optical medium as described in Clark U.S. Pat. No. 4,874,709 which shall serve as an example medium from which to describe the principles of the present invention. The cross section comprises several layers including a substrate layer 10, an expansion layer 12, a retention layer 14, a reflective layer 16, and a protective surface layer 18.

Previously recorded data bump 6 was created on disc 4 by deforming the expansion and retention layers 12 and 14. FIGS. 3A-B illustrate the deformation of the disc expansion and retention layers to form the single bump 6. In FIG. 3A, a write beam 20, typically generated by a semiconductor laser, is directed at the portion of the disc where the bump is desired. Expansion layer 12 is composed of a material, usually a base resin with a high coefficient of thermal expansion. Layer 12 also contains a dye which enables it to absorb more of the energy emitted by the write beam laser. When write beam 20 focuses on the desired region of disc 4, the expansion layer located under the beam heats up and expands. Expansion cannot occur in the direction of substrate layer 10 because substrate layer 10 is formed of a hardened material, usually polycarbonate, glass or an amorphous polymer, which does not respond to the energy levels of the write beam laser.

Retention layer 14, formed from a resin or dye polymer, however, has a high glass transition temperature, and becomes soft when exposed to the energy of the write beam laser. Retention layer 14, may also contain a dye which enables it to absorb more of the energy contained in the write beam. The softening of retention layer 14 permits expansion layer 12 to expand into retention layer 14 forming a detent. Once the write beam passes by the region containing the bump, the area starts to cool. Retention layer 14 returns to a hardened state much quicker than expansion layer 12 can return to its original shape. As a result, retention layer 14 hardens around the detent formed by the expansion of expansion layer 12, holding region 6a in tension thereby creating data bump 6.

Figure 3C:
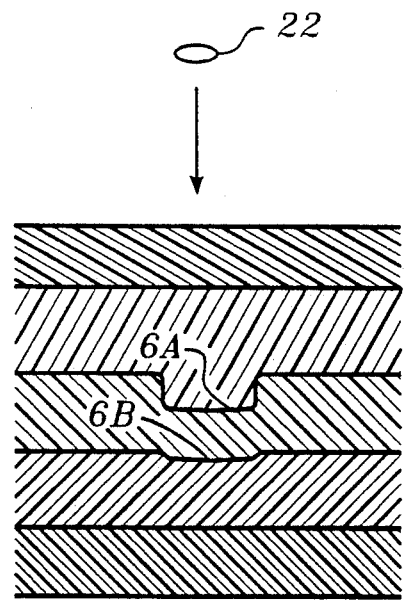
Figure 3D:
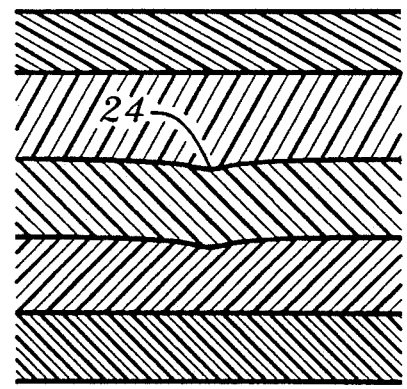

To erase data bump 6, an erase beam 22 must pass over the area containing the bump pattern to be erased as shown in FIG. 3C. The erase beam is also generated by a laser or laser diode, but the laser is usually of a different wavelength than the laser used to generate the write beam. A semiconductor laser is typically used. The erase beam will be focused on the plane of retention layer 14. Retention layer 14 contains a dye which aids in absorbing the energy of the erase beam. The material of expansion layer 12 does not react when exposed to the erase beam. The energy absorbed by retention layer 14 transitions the layer from the hard to the soft state. Region 6a of expansion layer 12 is no longer held in tension and snaps back into its original position. FIG. 3D shows the cross section of disc 4 after erase beam 22 has passed over. Bump 6 has been almost completely removed. In typical single spot erase systems, a small mark 24 frequently remains.

Erase beam 22 advances over disc 4 ahead of write beam 20. Therefore when the write beam reaches the portion of the disc previously containing data bump 6, the material has been returned to its virgin state by the erase beam process. New data can be written in this location according to the write procedure outlined above.

Once the erase/write process is completed, the newly stored data may be read by a read beam (not shown). The read beam consists of a monochromatic light source, having a wavelength approximately four times the bump height. The light passes through the medium layers before being reflected by the reflective layer 16. Reflective layer 16 is typically formed of aluminum but can be formed of many types of reflective materials. Because the bump height is one quarter of a wavelength of the light used, light reflected from a bump has travelled half a wavelength less than light reflected from the mirror surface and will be out of phase with it. This features causes destructive interference reducing the intensity of light reflected from a region containing a bump. The system reading the medium detects this change in intensity and converts the change to an electrical signal which is processed by the system into the desired output.

Enlarged Soot Erasure of Optical Media

Figure 4:
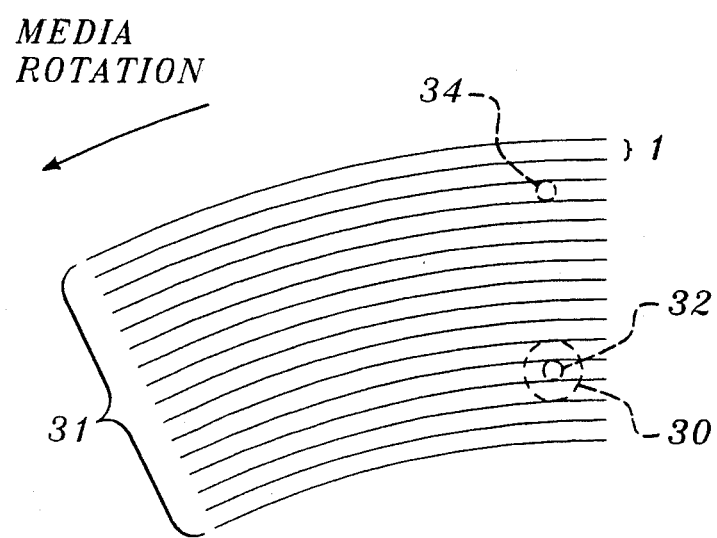
FIG. 4 shows a plan view of the projections of an enlarged spot beam onto an optical medium according to an embodiment of the present invention.

FIG. 4 shows a plan view of the projection of enlarged spot erase beam 30 onto medium 31 according to the present invention. Area 32 illustrates an erase beam projection of a single track erase spot used in the typical systems. Area 34 shows the projection of the write beam on the medium.

In the preferred embodiment, the diameter of erase beam 30 equals three times the track pitch The enlarged spot erasure technique of the present invention will, however, function over a diameter range of two to four times the track pitch. A three pitch diameter spot optimizes the tradeoff between the improved alignment tolerances and reduced area energy density of larger spot diameters.

Figure 5A:
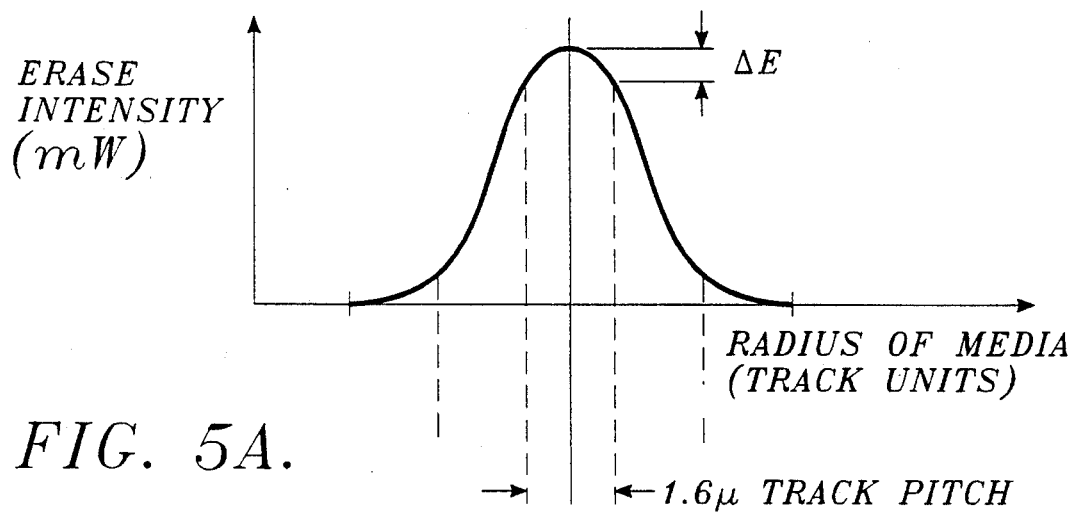
FIGS. 5A and 5B are is a cross section of the enlarged erase beam energy profile and plan views of the enlarged spot according to an embodiment of the present invention.
Figure 5B:
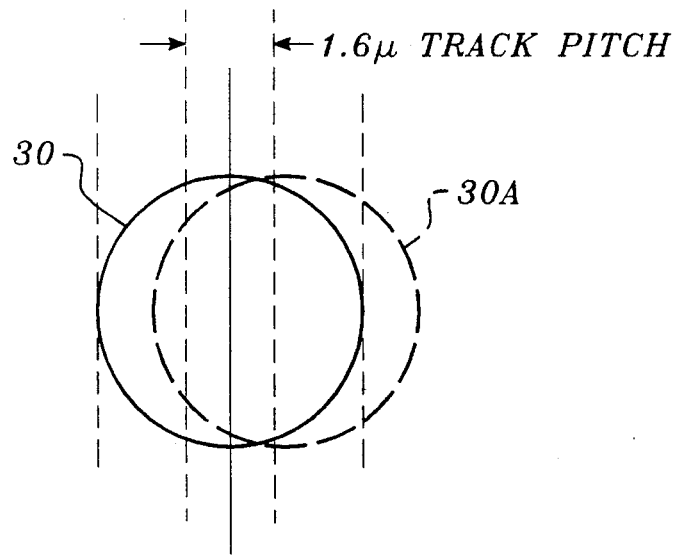

In FIG. 5 a cross section of the enlarged erase beam energy profile is shown together with a plan view of the enlarged spot. FIG. 5 shows the worst case misalignment condition in which a central track is located within one half ($\frac{1}{2}$) track pitch from the center of erase beam projection 30a. Item 30 in FIG. 5 shows the projection of erase beam 22 when properly aligned. From the energy curve shown in the upper portion of FIG. 5, the difference in energy a track sees when misaligned by one half track versus when the track is centrally aligned is minimal. Therefore, precise alignment of the beam over the bump is not critical, since the enlarged erase spot will erase whatever is in its path.

Alignment of the erase beam with the record beam, however, remains of concern. The erase beam should remain several tracks ahead of the record beam to prevent accidental erasure of just recorded data. The erase beam should also remain sufficiently far ahead of the record beam so the medium has time to cool and return to its initial condition. Although the recorder design determines the separation exact value, typical specifications require that the erase beam center be located within three to six tracks of the record beam. For a 1.6 micron track pitch, the position of the erase beam of the present invention need only be accurate to within 4.8 microns (three times the track pitch of 1.6 microns). This alignment tolerance is much less critical than the alignment tolerance of small erase spots. In the preferred embodiment, the center of the erase beam is located five to seven and a half tracks in front of the record beam.

The enlarged erase spot of the present invention also improves the completeness of erasure in addition to alleviating alignment problems Since the erase beam is three times the track pitch, the data bump spends three times as long under the enlarged erase beam than under a single spot erase or record beam. A more gradual heating over a longer period of time occurs rather than the short, high intensity heating of the single spot beam. In addition to heating the larger area of the medium located directly under the beam, the enlarged spot also heats an even larger area by conduction. The medium exposed to the enlarged spot erase beam of the present invention thus undergoes a more gentle cooling cycle than the rapid quench from the cool surrounding polymer experienced in single spot erase beam systems.

If insufficient time to cool exists, a residual mark may remain in the medium. The residual mark results when the expansion and retention layers have insufficient time to return to their virgin state from the data retention state before cooling and becoming hard. Residual marks may later be errantly interpreted as a data bump by the read beam.

The longer, less severe cooling cycle of the enlarged spot erase beam of the present invention, makes formation of such residual marks less likely. In addition, the expanded heated area created by the enlarged spot cannot deform to the same extent a smaller heated area can deform. Thus, any residual mark which does form, will be shallower and cover more area than residual marks left by single spot erase beams. The larger area, shallower spot is less likely to be interpreted by the read beam as a data bump.

Enlarged Erase Beam Optics

Figure 6:
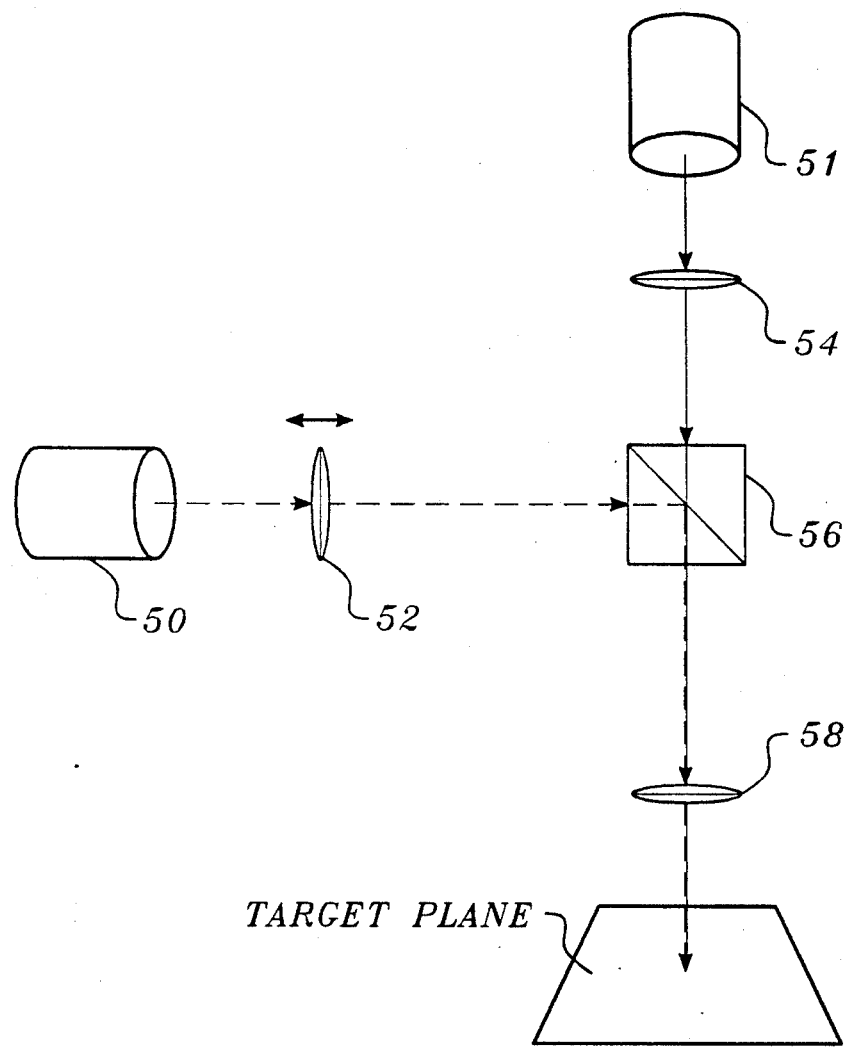
FIG. 6 shows an optical system which may be used to implement the enlarged erase spot according to an embodiment of the present invention.

FIG. 6 shows an optical system which can be used to implement the enlarged erase beam of the present invention. The system contains an erase beam source 50; typically a semiconductor laser, and a record beam source 51 which is also a semiconductor laser. Laser light emitted from sources 51 is typically highly polarized but does contain wavelight oriented perpendicular to the major wavelight axis. The optical system contains a collimating lens 52 and 54 for each beam. The collimating lens focuses the given beam into parallel rays. Light passing through collimating lenses 52 and 54 then passes through polarizing prism 56, also known as a beam splitter. Beam splitter 56 transmits incident light oriented along a given axis and reflects light oriented along other axes. For example, in FIG. 6, wavelight oriented along the major axis (s wave) will be transmitted by beam splitter 56 emitted from source 50 while wavelight oriented perpendicular to the s wave (p wave) will be reflected. Conversely, the s wave of light emitted from source 51 will be reflected while the p wave of light emitted from source 51 will be transmitted. Laser light sources are oriented such that the maximum light energy is contained in the plane to be transmitted. Beam splitter 56 thus enables the beam light, which is projected from two different directions to come together and travel down a single path perpendicular to the plane of the medium. The beams then pass through objective lens 58 which focuses the beams on the medium.

If the erase beam and the record beam are of the same wavelength, the enlarged erase spot of the present invention can be created by moving the position of the collimating lens 52 to prediverge the beam. This movement changes the focal point of the erase beam and results in an enlarged spot size on the plane of the medium.

If the erase beam and the record beam are of different wavelengths, the enlarged erase spot can also be created by moving the position of collimating lens 52 to prediverge the beam. Alternately, the spot size may be adjusted by the use of diffraction limiting optics. The optics will be optimized to create a diffraction limited write spot focused on the surface of the medium. The focused, diffraction limited write spot enables precise bit by bit recordation of data on the medium. The spot size is proportional to the erase beam wavelength divided by the numerical aperture of the objective lens. Specifically: spot size $K\lambda/N$, where $k$ = constant
$\lambda$ = wavelength
$N$ = numerical aperture of the lens. When the wavelengths of the record and erase beams differ, the optics which provide the diffraction limited write spot therefore create an erase spot which differs in size from the write spot by the ratio of the beam wavelengths.

Furthermore, when the erase beam and record beams are of different wavelengths, the single objective lens 58 has a different focal point for each beam. Therefore, while the write spot is precisely focused on the medium, the erase spot may be focused on a plane other than the plane of the medium. The spot size of the two beams on the plane of the medium thus may be different for each of the two beams. Hence, an enlarged erase spot is created by an optical system designed to produce a diffraction limited, focused write spot on the plane of the medium.

Alignment of the erase beam with the record beam to maintain the desired track separation between beams can be accomplished by controlling initial placement of the beam source. Erase beam source 50 and record beam source 51 are positioned relative to each other such that each beam passes through a different portion of beam splitter 56. The erase and record beams emitted from the beam splitter therefore pass through different portions of objective lens 58 separated by the desired distance. Because the track pitch is on the order of microns, the separation distance between the beams is typically on the order of 100 microns or 0.1 millimeters. The focal area of objective lens 58, however, is on the order of millimeters and thus differs by a factor of ten from this separation distance. Therefore, beam sources 50 and 51 can be positioned to obtain the desired beam separation without affecting beam focus, and hence the desired spot size, on the medium. The beam source position and beam source diameter can be determined to an accuracy of 0.1 millimeters (mm).

Figure 7:
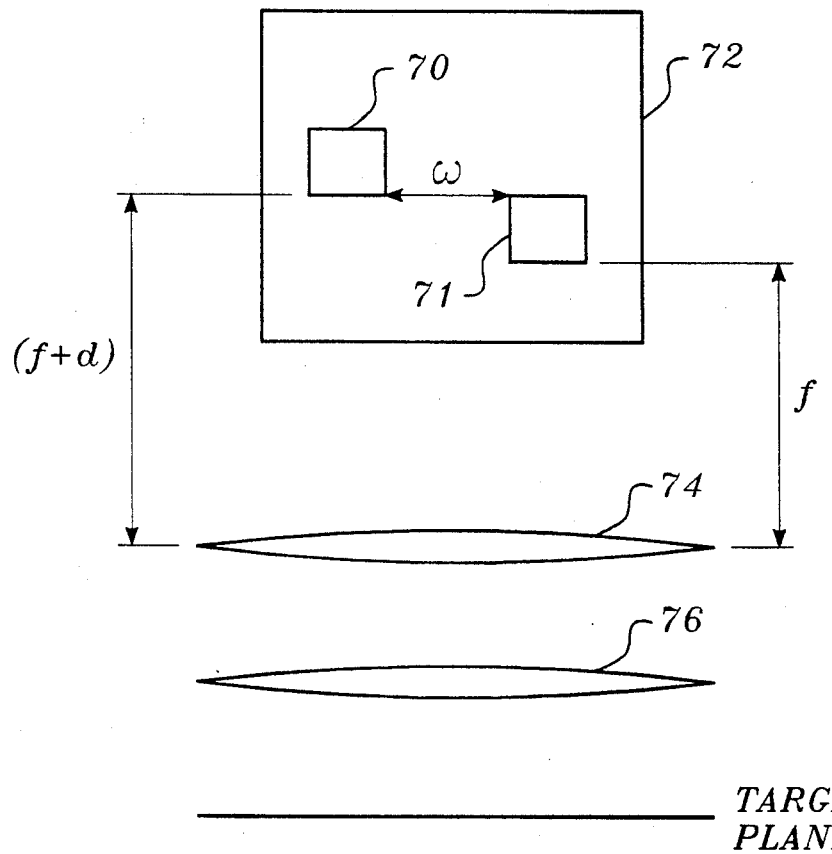
FIG. 7 shows an alternate optical system which may be used to implement the enlarged erase spot according to an embodiment of the present invention.

FIG. 7 shows an alternate optical system which can be used to implement the enlarged erase beam of the present invention. In the alternate optical system, the erase beam source and the record beam source each comprise a laser diode, 70 and 71 respectively, mounted on a single unitary structure, heat sink 72. As drawn in FIG. 7, each laser diode is contained in its own housing and the two diodes are separated from each others by a distance, ω. If both laser diodes 70 and 71 emit light of the same wavelength, a single collimating lens 74 is provided for both diodes. An objective lens 76, focuses the erase and record beams onto the plane o he medium. The embodiment described in FIG. 7 does not include a beam splitter. In addition, one collimating lens can be used. This structure results in a smaller, less costly optical head than in embodiments including a beam splitter.

In FIG. 7, alignment of the erase beam with the record beam is controlled by the distance ω separating the two beam sources 70 and 71. As described in conjunction with the embodiment of FIG. 6, the separation distance, ω, between the two beams is typically on the order of 100 microns while the focal areas of objective lens 76 and collimating lens 74 are each on the order to millimeters. Beam sources 70 and 71 can, therefore, be positioned to obtain the desired beam separation without affecting the beam focus, or spot size, on the plane of the medium. The separation distance, ω, between beam sources 70 and 71 thus equals the separation distance between the spots projected onto the medium. The ability to establish the desired separation distance using the fixed mounting and optical structure of FIG. 7 makes spot alignments relatively insensitive to heat and optical effects and also reduces the manufacturing tolerances from those required in production of the embodiment of FIG. 6.

If the erase beam and record beam are the same wavelength, the enlarged erase spot of the present invention can be crated by controlling the distance between the erase beam source 70 collimating lens 72. For collimating lens 72 to focus a beam into parallel easy of light, the beam source must be located at the focal distance, f, of the collimating lens. If the beam source is located at a distance other than f, the light rays passing through the lens will be either converging or diverging, but will not be parallel. The write, or record spot requires a diffraction limited spot projection on the surface of the medium. Record beam source 71 is therefore located at the focal distance f of the collimating lens. The erase beam can be predivered to obtain the enlarged erase spot by locating the erase beam source 70 a distance f+d from collimating lens 74.

If the wavelength of the erase beam differs from the wavelength of the record beam, the erase beam can also be predivered by locating the erase beam source 70 a distance f+d from collimating lens 74. Optionally, the spot sizes can be controlled using diffraction limiting optical as described in conjunction with the embodiment pictured in FIG. 6.

Conclusion

The preferred embodiments of the present invention have now been described. Variations and modifications will now be apparent to those skilled in the at. For example, the erase system of the present invention is suitable for use with a variety of thermal optical structures including phase change structures, and application of the invention is not limited to the specific structure described herein. In addition, creating the enlarged erase spot is not limited to just one of the various methods described herein to the exclusion of others. The several methods can be combined to generate an enlarged erase spot. The invention should therefore be construed in light of the claims.

What is claimed is:

1. An apparatus for erasing and recording daa, represented as bumps and arranged in tracks, on an optical medium comprising:
   a first light source emitting a first light of a first wavelength for erasing data contained on said medium;
   a second light source emitting a second light of a second wavelength for recording data on said medium;
   means for focusing said first light such that a diameter of an erase spot projected on said medium by said first light source is at least two times a track pitch of said medium; and
   means for focusing said second light such that a diameter of a write spot projected on said medium by said second light source is approximately equal to one times the track pitch.

2. The apparatus of claim 1 further comprising a means of positioning said first an second light sources relative to each other such that a center of said erase spot is a given number of tracks ahead of a center of said write spot.

3. The apparatus of claim 1 wherein said first wavelength is approximately equal to said second wavelength.

4. The apparatus of claim 1 wherein said means for focusing comprises:
   a beam splitter;
   a first collimating lens disposed between said first light source and the beam splitter;
   a second collimating lens disposed between said second light source and the beam splitter; and
   an objective lens disposed between said beam splitter and said medium.

5. The apparatus of claim 4 wherein said first collimating lens is positioned relative to said first light source to control the diameter of said erase spot.

6. The apparatus of claim 1 wherein said means for focusing comprises:
   a collimating lens disposed between said first light source and said optical medium and between said second light source and said optical medium; and
   an objective lens disposed between said collimating lens and said optical medium.

7. The apparatus of claim 6 wherein said collimating lens can be variably positioned to control the diameter of said erase spot.

8. The apparatus of claim 1 wherein said first and second light sources are mounted on a single unitary structure.

* * * * *